(12) United States Patent
Äijä et al.

(10) Patent No.: US 6,928,579 B2
(45) Date of Patent: Aug. 9, 2005

(54) CRASH RECOVERY SYSTEM

(75) Inventors: Gunnar Äijä, Rimforsa (SE); Alexander Larsson, Chapel Hill, NC (US)

(73) Assignee: Nokia Corporation, Espoo (FI)

( * ) Notice: Subject to any disclaimer, the term of this patent is extended or adjusted under 35 U.S.C. 154(b) by 836 days.

(21) Appl. No.: 09/893,270

(22) Filed: Jun. 27, 2001

(65) Prior Publication Data

US 2003/0005037 A1 Jan. 2, 2003

(51) Int. Cl.$^7$ .............................................. G06F 11/00
(52) U.S. Cl. ............................... 714/6; 714/4; 714/15; 717/168; 717/174
(58) Field of Search ............ 714/4, 6, 15; 717/168–178

(56) References Cited

U.S. PATENT DOCUMENTS

| | | | |
|---|---|---|---|
| 5,157,663 A | | 10/1992 | Major et al. |
| 5,924,102 A | * | 7/1999 | Perks ......................... 707/200 |
| 5,974,547 A | | 10/1999 | Klimenko |
| 6,175,904 B1 | | 1/2001 | Gunerson |
| 6,209,089 B1 | | 3/2001 | Selitrennikoff et al. |
| 6,259,442 B1 | | 7/2001 | Britt, Jr. et al. |
| 6,393,585 B1 | * | 5/2002 | Houha et al. .................. 714/23 |
| 6,397,385 B1 | * | 5/2002 | Kravitz ........................ 717/173 |
| 6,490,722 B1 | * | 12/2002 | Barton et al. ................ 717/174 |
| 6,532,537 B1 | | 3/2003 | Chen et al. |
| 6,557,169 B1 | * | 4/2003 | Erpeldinger ................. 717/173 |
| 6,591,376 B1 | * | 7/2003 | VanRooven et al. .......... 714/36 |
| 6,615,365 B1 | * | 9/2003 | Jenevein et al. ............... 714/6 |
| 6,640,334 B1 | * | 10/2003 | Rasmussen .................. 717/171 |
| 6,748,553 B2 | * | 6/2004 | McBride et al. .............. 714/15 |
| 2002/0053044 A1 | | 5/2002 | Gold et al. |
| 2003/0065913 A1 | | 4/2003 | Cepulis et al. |

FOREIGN PATENT DOCUMENTS

| | | | |
|---|---|---|---|
| WO | WO 95/22794 | 8/1995 | |
| WO | WO 00/58834 | 10/2000 | ........... G06F/11/14 |

OTHER PUBLICATIONS

Bruce Brown, Web Page Printout (printed on Jun. 14, 2001), ZDNet: Go Back.
Web Page Printout (printed on Jun. 14, 2001), ZD Net: Wild File, Inc. Go Back 2.1.
Web Page Printout (prited on Jun. 14, 2001), Roxio 1 Go Back 3 Overview.
Help Pages from the Wild File Go Back Program for Gateway computers (1999).
U.S. PTO Office Action from U.S. Appl. No. 09/970,499 dated Jul. 13, 2004.
U.S. PTO Office Action from U.S. Appl. No. 09/970,499 dated Feb. 9, 2005.

* cited by examiner

*Primary Examiner*—Robert Beausoliel
*Assistant Examiner*—Emerson Puente
(74) *Attorney, Agent, or Firm*—Cohen, Pontani, Lieberman & Pavane

(57) ABSTRACT

A client device is connectable to a server via a communication network for receiving new software packages. The client device includes a pair of system partitions designated as current and backup system partitions and at least one package partition on which all installed system packages are saved. A central processing unit of the client device uses the contents of the current system partition. In response to an startup failure or a runtime failure, the client device reboots using the backup system partition and allows a user to selectively install any of the software packages saved on the at least one package partition.

28 Claims, 7 Drawing Sheets

CRASH RECOVERY SYSTEM

BACKGROUND OF THE INVENTION

1. Field of the Invention

The present invention relates to the installation of software and recovering from installation and runtime errors in a continuously updated and extended distributed computer environment.

2. Description of the Related Art

Many software systems are continuously being updated and extended with new system components and applications. Therefore, purchasers of such software systems often receive updates from the software manufacturers to update the original versions. These updates are typically transmitted by a server of the software provider to the client via a communication network such as the internet. The updates may be automatically sent or a user may download a new version of software via the internet. If any errors occur during either the download, installation, or runtime of the software, it is desirable if the client device can recover from the error. Preferably, the client device reverts back to a previous version of the software system. Furthermore, the installation itself, especially if it is automatic, must be performed so that it does not disturb the user's use of the device.

PCT Patent Publication No. WO 00/58834 discloses a software installation and recovery system for a television viewing computer system. In that system, the computer system has a three stage startup procedure including a bootloader stage, an operating system kernel stage, and an application stage. A persistent storage (hard disk) has two partitions for each stage of the three stage startup procedure, a primary partition and a backup partition. More specifically, there are two partitions dedicated to holding a copy of the second stage boot loader, two partitions holding a copy of the operating system kernel, and two partitions holding a copy of the application software. An indication is recorded that specifies which of the partitions of each pair is the primary and which is the backup. When a new software image is installed, the new image is first copied into the appropriate backup partition and an indication is made in the database that the software installation is underway. The primary and backup partitions are then swapped and the system is rebooted using the new primary partition of the software that has just been downloaded. Control is passed to the backup partition for each software component if the primary partition fails to load properly.

This prior art device includes a separate backup partition for the bootloader stage, the operating kernel loading stage, and the applications loading stage of the installation procedure. The disclosed system detects only failures during loading of programs associated with these stages. That is, this system detects whether the loading process for each of these stages is successfully completed. Accordingly, this system does not address runtime failures, i.e., failures which occur during the running of the programs such as if the program becomes non-responsive or "hangs".

SUMMARY OF THE INVENTION

The object of the present invention is to provide a client device and a method for keeping a software system that is continuously updated and extended consistent and stable over time.

The object is met by a method for recovering from installation and runtime errors on a client device, wherein the client device includes a persistent memory such as a hard drive including first and second system partitions and a package partition. The runtime components of a software system of the client device are installed in the system partitions. All installed packages are saved in the package partition. Furthermore, one of the first and second system partitions is designated the "current" partition and the other is designated the "back-up partition". The dual system partitions are used to perform a recovery procedure in which the software system returns to a previous version in response to a startup (boot) failure, a runtime failure (i.e. a failure that causes the program to "hang"), or a user request. Since at least all the software packages installed in the computer that have been downloaded from a remote server are saved on the package partition, it is possible to selectively reinstall these system components such as the operating system kernel and applications. If the software packages for all the installed system components are saved on the package partition, it is also possible to fully reinstall the entire software system by installing all the software packages contained on the package partition.

When a new software package is received by the client device, the new software package is installed in one of the system partitions and is saved in the package partition. If the software package contains a critical component of the software system, i.e., a component that is continuously loaded or continuously running, the current system partition is first copied onto the backup partition. Then the new software package is installed on the backup system partition and saved on the package partition. If the new software package is a new version of an existing package, then the old version is deleted from the package partition. The designations of the backup and current system partitions are switched and the software system is restarted (rebooted) using the new current system partition which includes the new software. If a booting failure occurs or a runtime failure occurs, the recovery procedure described above is entered.

If the new software package does not contain a critical component, the new software package is installed on the current system partition and saved to the package partition. If the new software package includes a new version of an existing package, then the old version is deleted from the package partition. If a booting failure occurs or a runtime failure occurs, the recovery procedure described above is entered. The recovery procedure may also be initiated by a user of the client device to revert back to a previous version of the software system.

The above-described installation process and recovery process are particularly useful when the client device is a "smart accessory" such as a mobile phone, a set top box for cable or satellite television services, a personal digital assistant (PDA), or a personal computer (PC) which automatically receives software updates from a service provider. If a loading failure or runtime failure occurs, the smart accessory will revert to a previous version of the software. The user of the smart accessory can continue using the client device. Furthermore, the service provider may then provide a further update packet for non-user-interactive (automatic) installation to cure a bug or security problem.

The object of the invention is also met by a device having a persistent memory including first and second system partitions and a package partition for implementing the above described method.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
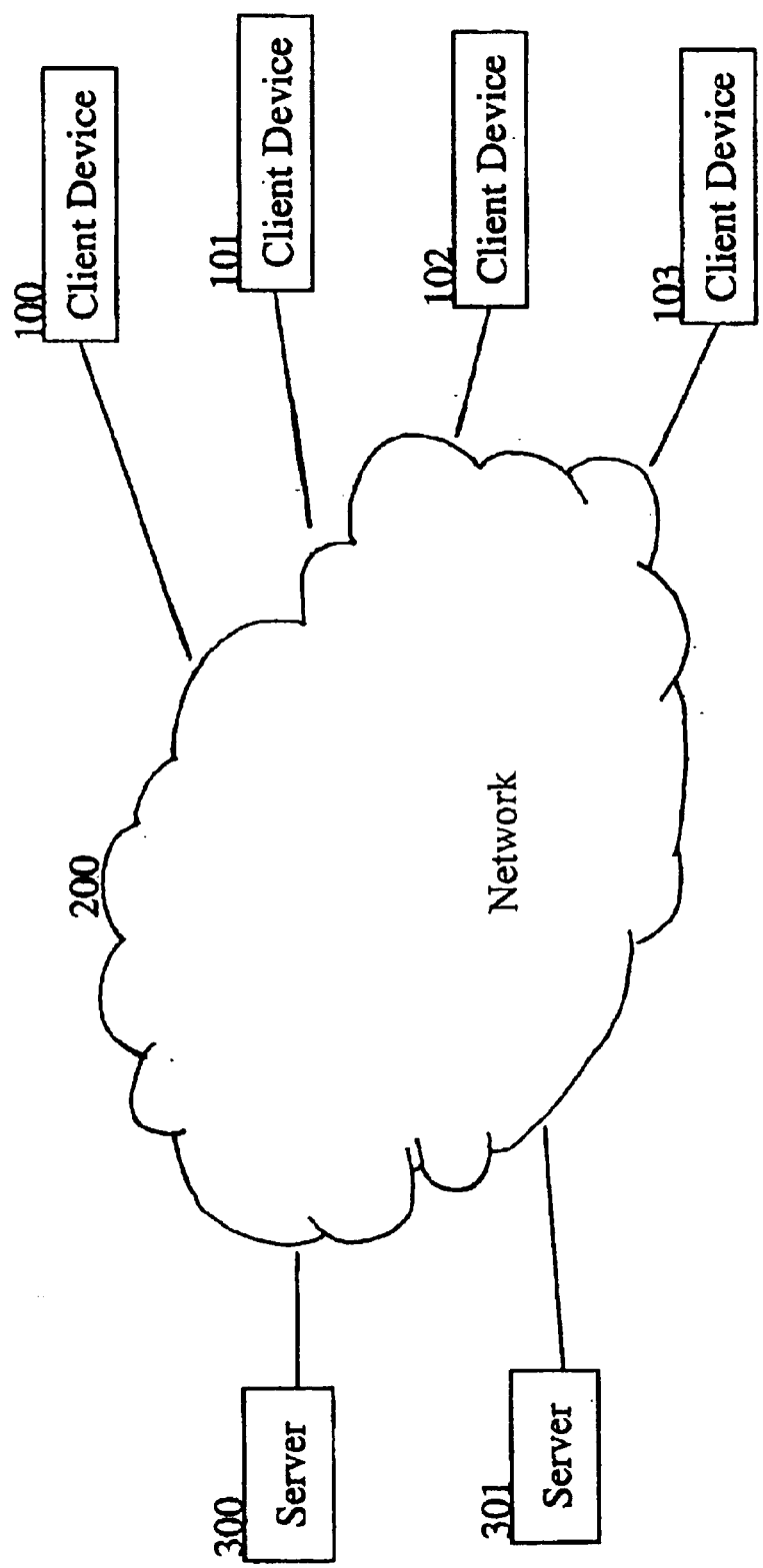
FIG. 1 is a schematic diagram of system in which the client device according to the present invention is connected.

FIG. 1 shows a distributed computer environment in which client devices 100, 101, 101, and 102 according to the present invention may be arranged. Each of the client devices 100–102 is connectable to servers 300 and 301 via a communication network 200 such as the world wide web or a satellite broadcast network. To maintain software or to install new software on one of the client devices 100, the server 300 may download software packages to the client device 100 through the communication network 200. The downloading may occur automatically or may be initiated by a user of the client device 100, i.e., the user may request a copy of a new version of the software. Although four client devices and two servers are shown, any number of devices may be connected through the network. Furthermore, the server 300 may be arranged so that the downloading of the software package occurs via a broadcast transmission by the server 300 to all client devices to which the software package applies.

Each of the client devices 100–102 may be any type of device that is connectable to a remote server through a communication network such as, for example, a mobile phone, a set top box for cable or satellite television services, a personal digital assistant (PDA), or a personal computer (PC).

Figure 2:
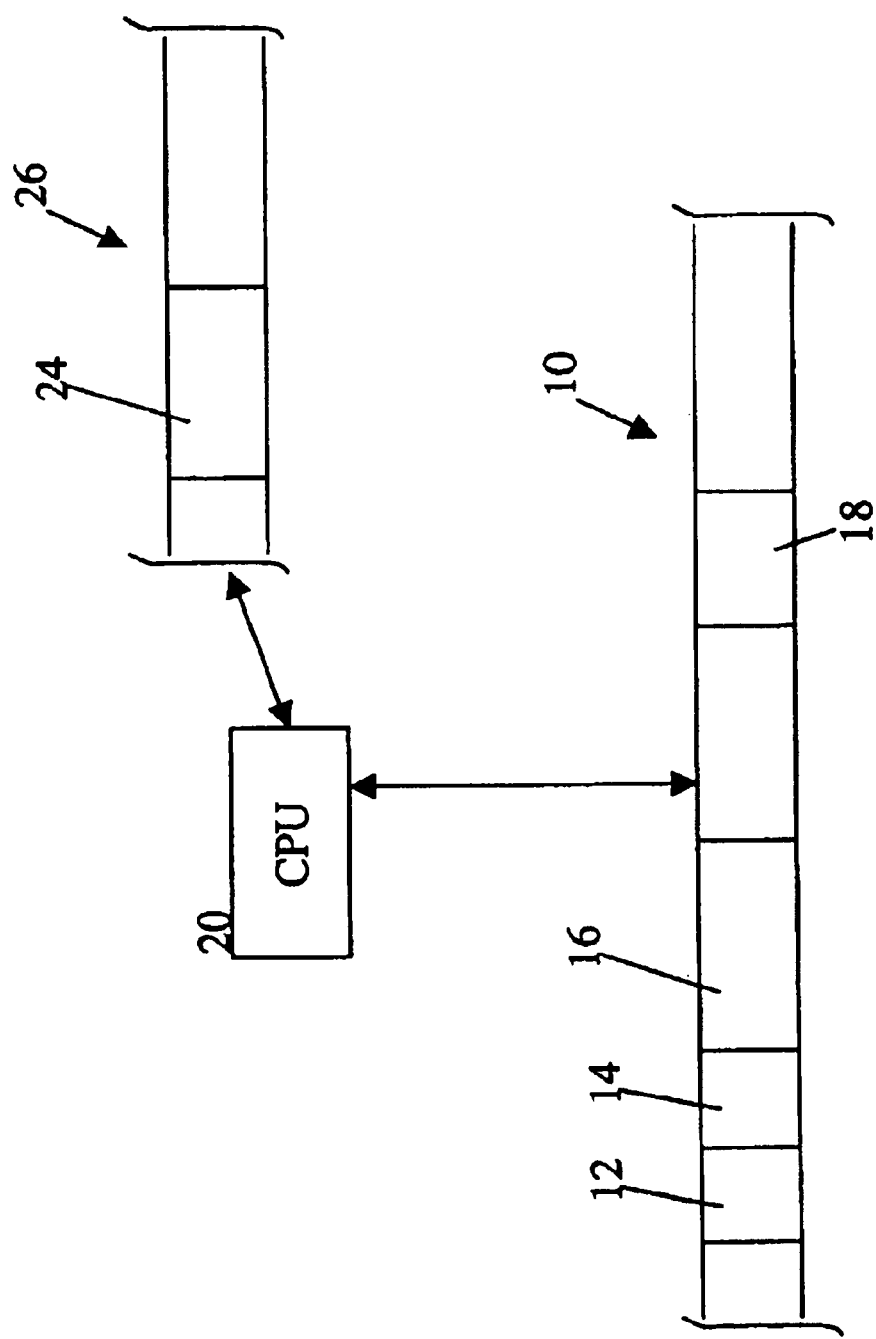
FIG. 2 is a partial schematic diagram showing portions of the client device according to the present invention.

FIG. 2 is a partial schematic diagram of the client device 100 which includes a persistent memory 10 such as a hard drive or other non-volatile memory and a CPU 20. The persistent memory has first and second system partitions 12, 14 and a package partition 16. The first and second system partitions 12, 14 are collectively referred to as the system partitions 12, 14.

During operation, one of the system partitions 12, 14 is designated the "current" system partition and the other is designated the "backup" system partition. This designation is stored in a boot indicator 24 in a non-volatile memory 26 of the client device 100. The nonvolatile memory 26 may comprise a part of the persistent memory 10 or may comprise a separate non-volatile memory. When the client device 100 starts, i.e., boots, the "current" one of the system partitions 12, 14 is used. The information in the boot indicator 24 instructs the CPU 20 regarding which of the system partitions 12, 14 is the current partition.

Runtime components of the software system of the client device 100 are stored in the system partitions 12, 14. The runtime components include an operating system kernel, system commands, configuration files, libraries, a window system, applications and tools, and the user interface. When no new software package is being downloaded to the client device 100, the current system partition contains the latest version of the runtime components of the software system and the backup system partition contains the previous version of the runtime components of the software system. The system partitions 12, 14 are used for the maintenance and installation of software and for recovering from a "crash" of the client device 100 by allowing an automatic return to the previous version of the system software in response to the crash as discussed in further detail below.

The package partition 16 is a space in the persistent memory 10 which may include a copy of all of the software packages installed on the computer (thus providing a means for reinstalling the software system from scratch). Alternatively, the package partition 16 may include copies of only the new downloaded software packages. A package management system 18 includes a package database in each of the system partitions 10, 12 including information relating to the dependencies between the software packages and versioning information about the software packages installed in the associated ones of the system partitions 10, 12.

Figure 3:
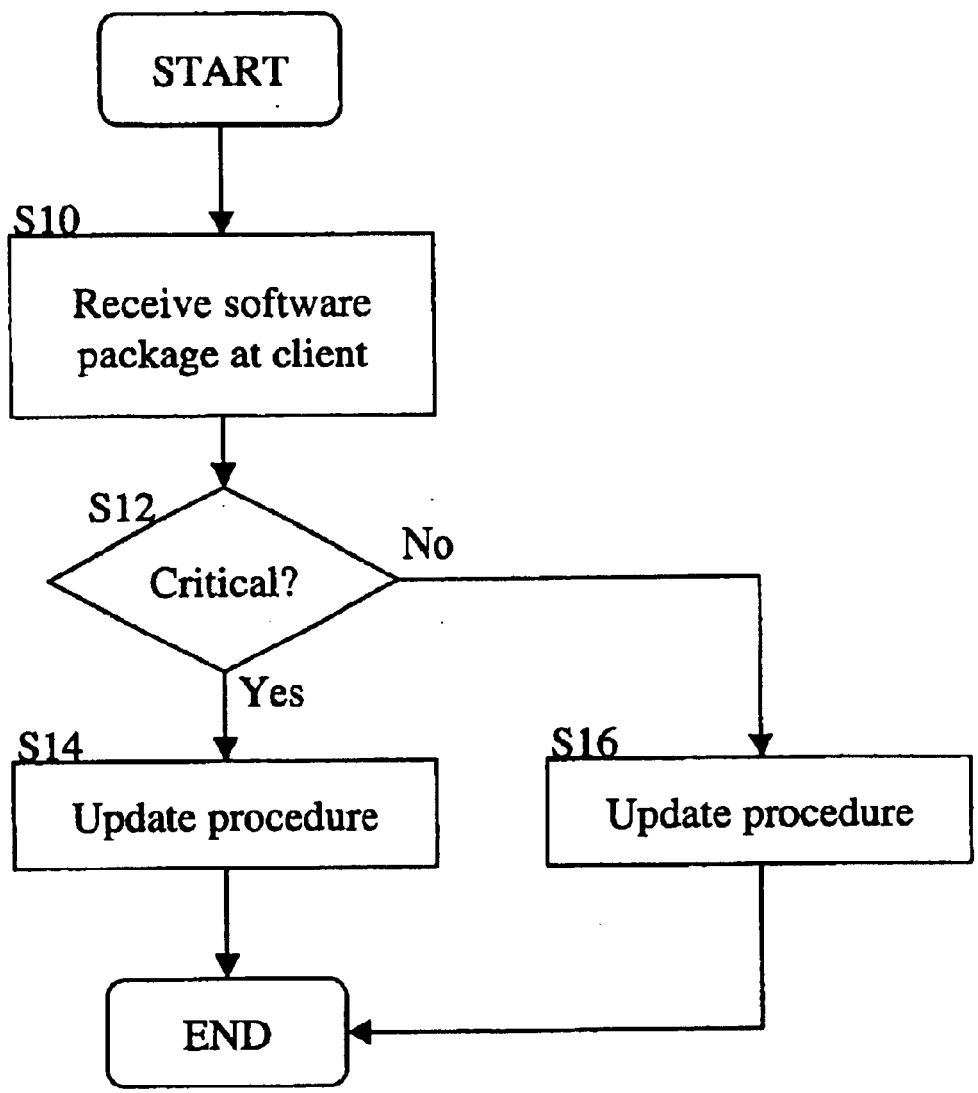
FIG. 3 is a flow diagram showing the method according to the present invention of installing a new software package.

FIG. 3 shows the process for installing new software packages onto the client device 100. For the description of the installation of a new software package, we will assume that the first system partition 12 is the current partition and the second system partition 14 is the backup partition at the start of the process for installing new software packages.

When a software installation package is received by the client device 100 from a server 300, step S10, the client device 100 must determine whether the software installation package includes a critical component of the system, step S12. To accomplish this, the software package is transmitted from the server 300 with a meta-file which includes specific information regarding whether the software component package includes a critical component. If the software does contain a critical component, an upgrade is performed in step S14. If the software contains only non-critical components, an update is performed in step S16.

Critical components are components that are continuously running or loaded and that require a system reboot/restart to run when upgraded. In the present embodiment, e.g., the operating system kernel, the device drivers, and the window system are considered critical components. Non-critical components include, e.g., new applications, system commands, and configurations files. Other components must be evaluated by the software manufacturer on a case by case basis to determine whether they are considered critical components.

Figure 4:
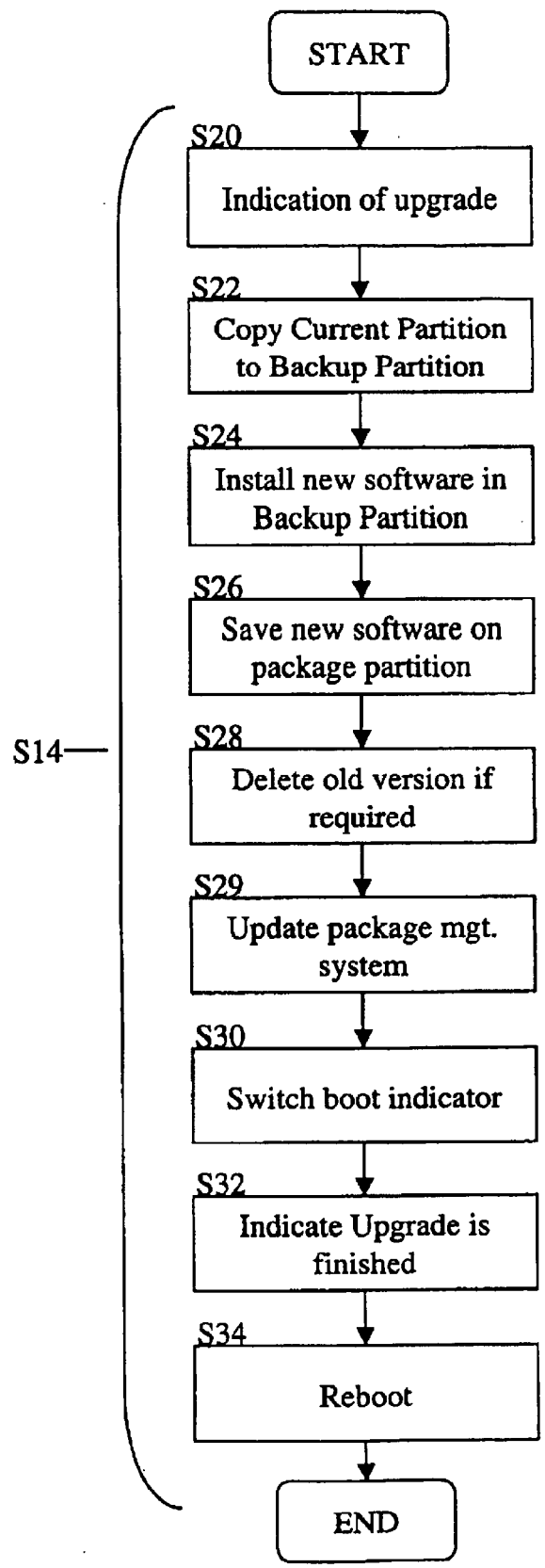
FIG. 4 is a flow diagram showing an upgrade procedure of the method in FIG. 3.

FIG. 4 illustrates the steps for the upgrade procedure which applies to the installation of a software package containing a critical software component. In step S20, an indication is made in the non-volatile memory of the client device 100 that the upgrade procedure has started. This indication allows the client device 100 to determine whether the upgrade was interrupted before being finished. Then the current system partition, i.e., the first system partition 12 in this case, is copied onto the backup system partition, i.e., the second system partition 14, step S22. The new software package is then installed on the backup system partition 14, step S24. The new software package is then also saved on the package partition 16, step S26. If the new software package is a replacement of a preexisting version, then the preexisting version of the software package is deleted from the package partition, step S28. In addition, the information in the package management system 18 must be updated for the new software package, step S29. This information may be in a meta-file sent with the new software package. After the new software package is installed, the boot indicator 24 in the non-volatile memory 26 is updated so that the backup system partition, i.e., the second system partition, is labeled as the current system partition and the current system partition, the first system partition, is labeled as the backup system partition, step S30. Accordingly, after step S30, the second system partition 14 is designated as the current system partition and the first system partition 12 is designated as the backup system partition. In step S32, the indication in the nonvolatile memory 26 is changed to indicate that the upgrade procedure is finished. The client device 100 is now rebooted in step S34 using the current system partition 14 which includes the new software package.

Figure 5:
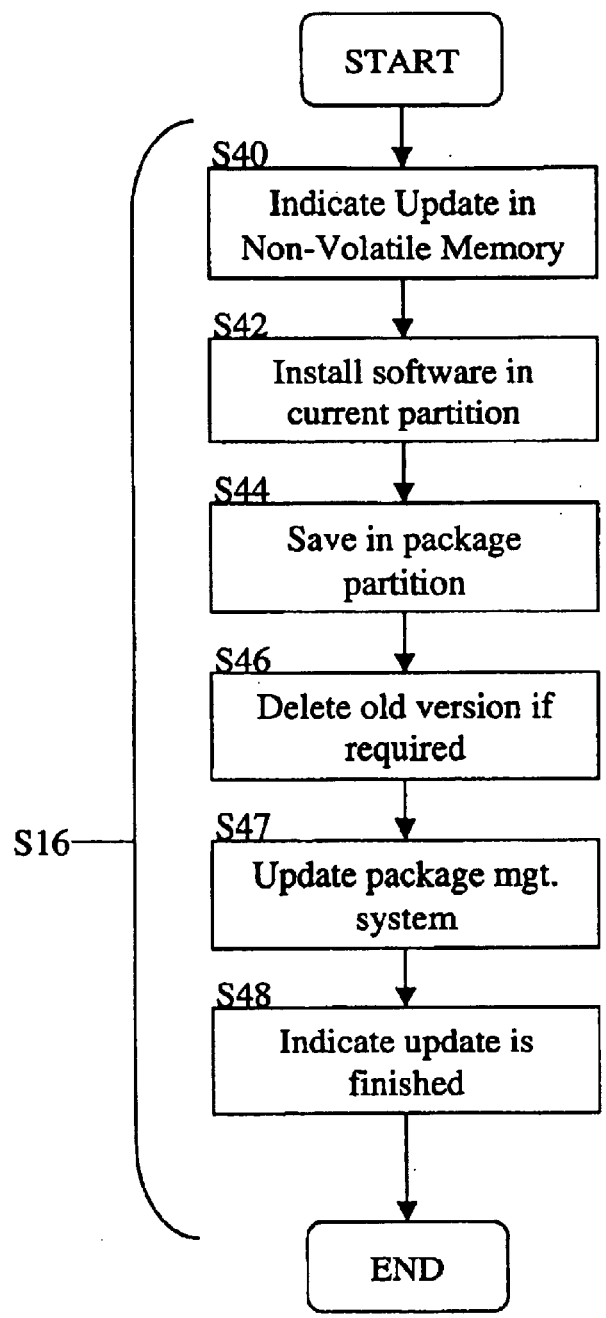
FIG. 5 is a flow diagram showing an update procedure of the method of FIG. 3.

FIG. 5 shows the steps for the update procedure which applies to the installation of a software package containing only non-critical software components. In step S40, an indication is made in a non-volatile memory of the client device 100 that the update procedure has started. This indication allows the client device 100 to determine whether the update procedure was interrupted before being finished. The new software package is then installed into the current system partition 12, step S42. The new software package is then also saved on the package partition 16, step S44. If the new software package is a replacement of a preexisting version, then the preexisting version of the software package is deleted from the package partition, step S46. The information in the package management system 18 is updated for the new software package, step S47. As stated above, this information may be in the meta-file sent with the new software package. In step S48, the indication in the non-volatile memory is changed to indicate that the update procedure is finished. A reboot is not needed for installation of non-critical components.

Figure 6:
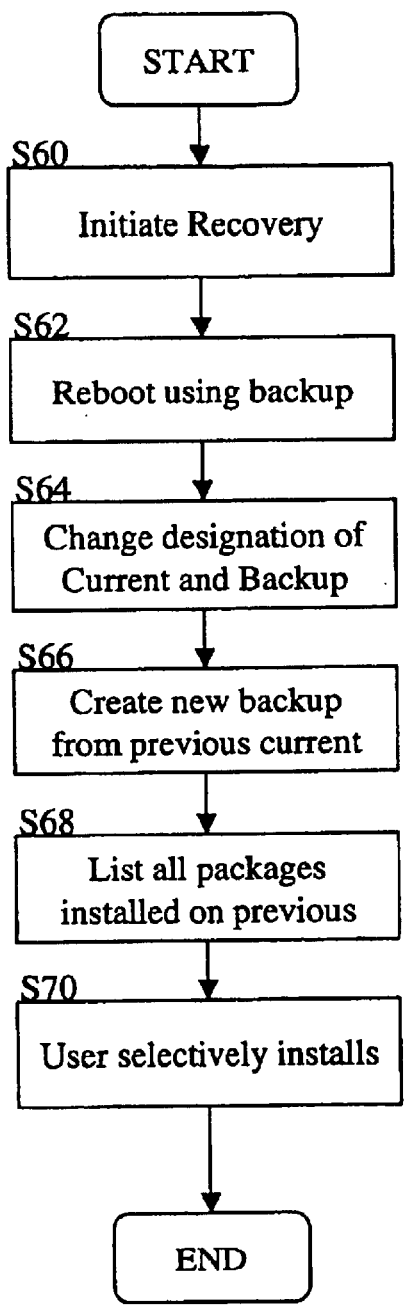
FIG. 6 is a flow diagram showing a recovery procedure for the client device of the present invention.

If a failure, i.e., a system crash, occurs in the client device 100 after the installation process of FIG. 3, the client device initiates a recovery process. FIG. 6 is a flow diagram illustrating the recovery process. The recovery process may be initiated in step S60 by a startup (boot) failure, a runtime (hangup) failure, or by a user request to revert back to a previous version of the system. Instead of initiating the recovery period at each runtime failure, the recovery process may alternatively be initiated after a number of hangups, i.e., five, occur within a predefined time period. After initiation of the recovery process, the client device 100 starts, i.e., boots up, from the backup one of the first and second system partitions 12, 14, step S62. If the upgrade procedure of FIG. 4 has just been performed the backup system partition is the first system partition 12, and if the update procedure of FIG. 5 has been performed the backup system partition is the second system partition. The boot indicator 24 of the non-volatile memory 26 is then updated to indicate that the backup system partition is now the new current system partition, step S64. The switching of the boot indicator may be performed before rebooting of step S62.

A new backup system partition is then created by copying the previously current system partition, step S66, i.e., copying the system partition that was current during the step S60. The client device 100 then presents to the user a list of all software packages that were installed on the previously current system partition, step S68. This list of software packages may be kept on or derived from package databases of the package management system 18, which are updated for each upgrade and update procedure. The user may then selectively install application and system components on the system partition, step S70, from the list. Accordingly, if a user determines that a component that was previously installed caused the system to crash, the user can remove that component from the system package to avoid further problems in step S70.

Alternatively, the user could completely reinstall the system of the user device 100 in step S70 by installing all software packages saved on the package partition.

Accordingly, if the client device 100 is a mobile phone or a set top box for a cable or satellite television system, the user of the client device can continue using the device after a system crashes caused by an automatic download of a software package from the server 300. In this case, the user at the server 300 can selectively install the software programs as required.

Figure 7:
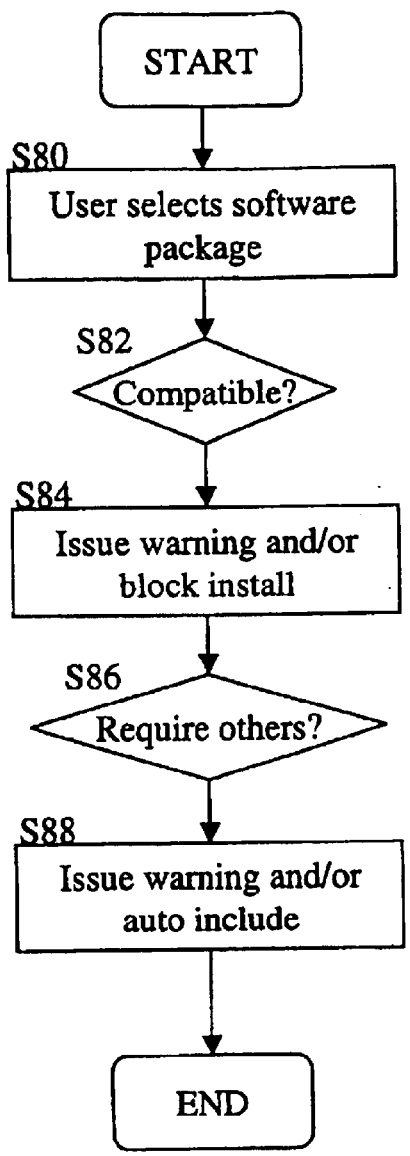
FIG. 7 is a flow diagram showing use of a packet management system.

FIG. 7 is a flow diagram showing how the package management system 18 may be used according to the present invention during the step S70 of FIG. 6. The package management system 18 provides information to the user regarding the dependencies between the various software packages on the package partition. When a user selects a user selected software package for installation in the system partitions during the recovery procedure after a "crash", step S80, the package management system 18 checks for compatibility with the existing software packages, step S82. If the user selected software package is not compatible with one of the existing software packages, the CPU 20 issues a warning and/or blocks the installation of the user selected software package, step S84.

The package management system 18 then determines whether the user selected software package requires any further software packages to support the user selected software package, step S86. If the user selected software package requires further software packages, the CPU 20 issues a warning and/or automatically includes the required software packages with the installation of the user selected software package, step 88.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for recovering from startup and runtime failures of a software system in a computer environment including a client device, comprising the steps of:
   (a) providing a persistent memory in the client device including at least first and second system partitions and at least one package partition, wherein runtime components of the software system are installed on the first and second system partitions and all installed software packages of the software system are saved on the at least one package partition;
   (b) designating one of the first and second system partitions as a current system partition and the other of the first and second system partitions as a backup system partition;
   (c) using the current system partition by a central processing unit of the client device for controlling the client device;
   (d) rebooting the software system of the client device using the backup system partition in response to one of an startup failure, a runtime failure of the software system of the client device, and a user request;
   (e) designating the backup system partition as the new current system partition;
   (f) creating a new backup system partition from the new current system partition; and
   (g) reinstalling the entire software system by installing all of the software packages residing on the at least one package partition after said step (f).

2. The method of claim 1, further comprising the step of allowing selective removal of the software packages from the at least one package partition after said step (f).

3. The method of claim 1, where the client device is one of a personal computer, a personal digital assistant, a mobile phone, a cable television set top box, and a satellite television set top box.

4. A method for recovering from startup and runtime failures of a software system in a computer environment including a client device, comprising the steps of:
   (a) providing a persistent memory in the client device including at least first and second system partitions and at least one package partition, wherein runtime components of the software system are installed on the first and second system partitions and at least the software packages of the software system downloaded from remote servers are saved on the at least one package partition;
   (b) designating one of the first and second system partitions as a current system partition and the other of the first and second system partitions as a backup system partition;
   (c) using the current system partition by a central processing unit of the client device for controlling the client device;
   (d) rebooting the software system of the client device using the backup system partition in response to one of an startup failure, a runtime failure of the software system of the client device, and a user request;
   (e) designating the backup system partition as the new current system partition;
   (f) creating a new backup system partition from the new current system partition; and
   (g) allowing selective removal of the software packages from the at least one package partition after said step (f).

5. A method for recovering from startup and runtime failures of a software system in a computer environment including a client device, comprising the steps of:
   (a) providing a persistent memory in the client device including at least first and second system partitions and at least one package partition, wherein runtime components of the software system are installed on the first and second system partitions and at least the software packages of the software system downloaded from remote servers are saved on the at least one package partition;
   (b) designating one of the first and second system partitions as a current system partition and the other of the first and second system partitions as a backup system partition;
   (c) using the current system partition by a central processing unit of the client device for controlling the client device;
   (d) rebooting the software system of the client device using the backup system partition in response to one of an startup failure, a runtime failure of the software system of the client device, and a user request;
   (e) designating the backup system partition as the new current system partition;
   (f) creating a new backup system partition from the new current system partition; and
   (g) allowing selective installation of software packages on the first and second system partitions from the software packages saved on the at least one package partition after said step (f).

6. The method of claim 5, wherein said step (g) further comprises using a package management system to determine dependencies between the software packages saved on the at least one package partition.

7. The method of claim 6, wherein said step (g) further comprises the steps of selecting a user selected software package on the package partition for installation in one of the system partitions, determining whether the user selected software package is compatible with existing installed software packages, and blocking installation of the user selected software package if the user selected software package is not compatible with existing installed software packages.

8. The method of claim 6, wherein said step (g) further comprises the steps of selecting a user selected software package on the package partition for installation in one of the system partitions, determining whether the user selected software package is compatible with existing installed software packages, and outputting a warning if the user selected software package is not compatible with existing installed software packages.

9. The method of claim 6, wherein said step (g) further comprises selecting a user selected software package from the package partition for installation in one of the system partitions, identifying other software packages on the package partitions required for the user selected software package using the package management system, and installing both the selected software package and the other software packages identified by the package management system.

10. A method for recovering from startup and runtime failures of a software system in a computer environment including a client device, comprising the steps of:
   (a) providing a persistent memory in the client device including at least first and second system partitions and at least one package partition, wherein runtime components of the software system are installed on the first and second system partitions and at least the software packages of the software system downloaded from remote servers are saved on the at least one package partition;

(b) designating one of the first and second system partitions as a current system partition and the other of the first and second system partitions as a backup system partition;

(c) using the current system partition by a central processing unit of the client device for controlling the client device;

(c1) performing a software package installation procedure for installing a new software package in the client device, wherein the step of installing a new software package includes the substeps of:

(i) receiving the new software package at the client device;

(ii) determining whether the new software package contains a critical component, the critical component being a component that requires a reboot of the client device to run after installation;

(iii) performing an upgrade procedure including installing the new software package in the background system partition if it is determined in said step (ii) that the new software package contains a critical component;

(iv) performing an update procedure including installing the new software package in the current system partition if it is determined in said step (ii) that the new software package does not contain a critical component; and (v) saving the new software package in the at least one package partition;

(d) rebooting the software system of the client device after said step (c1) using the backup system partition in response to one of an startup failure, a runtime failure of the software system of the client device, and a user request;

(e) designating the backup system partition as the new current system partition;

(f) creating a new backup system partition from the new current system partition.

11. The method of claim 10, further comprising the step of:

(g) allowing selective installation of software packages on the first and second system partitions from the software packages saved on the at least one package partition after said step (f).

12. The method of claim 11, wherein said step (g) further comprises outputting, by the client device, a list of software packages installed on the system partitions during the most recently performed software package installation procedure.

13. The method of claim 10, wherein said new software package replaces a preexisting software package such that said substep (v) further includes removing the preexisting software package from the at least one package partition after the new software package has been saved.

14. The method of claim 10, further comprising the step of indicating in a non-volatile memory of the computer that the installation process has started after said substep (i) and indicating in the non-volatile memory after said substep (v) that the installation process is completed.

15. The method of claim 10, wherein said substep (i) comprises receiving the new software package from a remote server via a communication network.

16. The method of claim 15, wherein said substep (i) comprises receiving the new software package from the remote server automatically.

17. The method of claim 15, wherein said substep (i) comprises receiving the new software package in response to a user request.

18. The method of claim 10, wherein said substep (ii) comprises reading a meta-file sent with the new software package to determine whether the package contains a critical component.

19. The method of claim 10, wherein said upgrade procedure of said substep (iii) comprises:

copying the current system partition to the backup system partition;

installing the new software package on the backup system partition;

saving the new software on the at least one package partition;

switching the designations of the current and backup system partitions so that the current system partition includes the new software package; and rebooting the client device with the current system partition.

20. The method of claim 19, further comprising the step of deleting an old version of the software package from the at least one package partition.

21. The method of claim 19, further comprising the step of updating a package management system of the client device used to determine dependencies between the software packages of the software system.

22. The method of claim 10, wherein said update procedure of said substep (iv) comprises:

installing the new software package on the current system partition; and saving the new software package on the at least one package partition.

23. The method of claim 22, further comprising the step of deleting an old version of the software package from the at least one package partition.

24. The method of claim 22, further comprising the step of updating a package management system of the client device used to determine dependencies between the software packages of the software system.

25. The method of claim 10, where said substep (iii) is performed if the new software package includes one of at least part of an operating system kernel, a device driver, and at least part of a window system.

26. A computer system comprising a client device connectable to a server via a communication network for receiving software packages, said client device comprising:

a persistent memory connected to said central processing unit, said persistent memory having two system partitions and at least one package partition, wherein runtime components of a software system of said client device are installed on said two system partitions, one of said two system partitions being designated as a current system partition and the other one of said two system partitions is designated as a backup system partition, and wherein all software packages installed in the computer system are saved on said at least one package partition;

a central processing unit connected to said persistent memory and using said current system partition for control;

means for automatically rebooting said computer system using the backup partition in response to one of a startup failure, a runtime failure, and a user request to revert to a previous software version; and means for allowing user selected ones of the software packages from the at least one package partition to be installed on one of the system partitions in response to one of a startup failure, a runtime failure, and a user request to revert to a previous software version.

27. The computer system of claim 26, wherein said client device comprises one of a personal computer, a personal digital assistant, and a mobile phone.

28. A computer system comprising a client device connectable to a server via a communication network for receiving software packages, said client device comprising:

a persistent memory connected to said central processing unit, said persistent memory having two system partitions and at least one package partition, wherein runtime components of a software system of said client device are installed on said two system partitions, one of said two system partitions being designated as a current system partition and the other one of said two system partitions is designated as a backup system partition, and wherein all software packages installed in the computer system are saved on said at least one package partition;

a central processing unit connected to said persistent memory and using said current system partition for control;

means for automatically rebooting said computer system using the backup partition in response to one of a startup failure, a runtime failure, and a user request to revert to a previous software version; and a package management system including information regarding the dependencies and version information for each of the software packages on the at least one package partition.

* * * * *